United States Patent [19]

Nagaoka

[11] Patent Number: 4,657,079

[45] Date of Patent: Apr. 14, 1987

[54] SCREEN

[75] Inventor: Tadayoshi Nagaoka, Matsubara, Japan

[73] Assignee: Nagaoka Kanaai Kabushiki Kaisha, Osaka, Japan

[21] Appl. No.: 709,826

[22] Filed: Mar. 7, 1985

Related U.S. Application Data

[63] Continuation of Ser. No. 549,635, Nov. 4, 1983, abandoned, which is a continuation of Ser. No. 326,718, Dec. 1, 1981, abandoned.

[30] Foreign Application Priority Data

Dec. 11, 1980 [JP] Japan ............................. 55-173767

[51] Int. Cl.⁴ .......................................... E21B 43/00
[52] U.S. Cl. .................................... 166/231; 166/234
[58] Field of Search ................ 166/231, 74, 157, 227, 166/234; 29/163.5 CW, 163.5 F, 163.5 R; 245/6; 52/653; 428/592

[56] References Cited

U.S. PATENT DOCUMENTS

| | | | |
|---|---|---|---|
| 982,485 | 1/1911 | Eberlein | 52/653 |
| 1,287,031 | 12/1918 | Johnson | 29/163.5 CW |
| 1,848,730 | 3/1932 | Lange | 166/234 |
| 2,155,744 | 4/1939 | Van Westrum | 166/231 |
| 3,816,894 | 6/1974 | Howard | 29/163.5 CW |
| 3,859,713 | 1/1975 | Fiedler | 29/163.5 CW |
| 3,957,087 | 5/1976 | Johnston | 52/653 |
| 4,079,500 | 3/1978 | Tolliver | 245/2 |

Primary Examiner—Melvyn J. Andrews
Assistant Examiner—John J. Zimmerman
Attorney, Agent, or Firm—Ladas & Parry

[57] ABSTRACT

A screen particularly suitable for use in deep well comprises a reinforcing member (2) of a generally cylindrical configuration, a plurality of support rods (3) arranged on the outside of the reinforcing member (2) in the axial direction thereof and a wire (4) wound helically on the outside of the support rods (3). A multitude of slits (2b) continuous in substantially the circumferential direction of the reinforcing member (2) are formed at a predetermined pitch in the reinforcing member (2). The screen made according to the invention has a much larger opening space and therefore has a greater fluid collecting efficiency than conventional screens while maintaining a sufficient strength against an external pressure.

6 Claims, 3 Drawing Figures

SCREEN

This is a continuation of co-pending application Ser. No. 549,635 filed on Nov. 4, 1983 now abandoned, which is a continuation of application Ser. No. 326,718, filed Dec. 1, 1981, now abandoned.

This invention relates to a screen or strainer suitable for use in a well for water, oil or natural gas and, more particularly, to a well screen to be used for a deep well.

A well screen to be used in a well having a depth of several hundreds or several thousands of meters underground is required to have a sufficient strength against a large magnitude of pressure which is applied from outside due to a well structure and operation conditions. For such well screen having a sufficient strength against the external pressure, a screen which is referred to by the skilled in the art as a "pipe base screen" has heretofore been used. This pipe base screen includes a steel pipe formed with a multitude of circular apertures or slots for collecting fluid such as water or oil, a plurality of rods disposed along the axis of the perforated steel pipe at an equidistant interval around the pipe and a wire rod wound around the rods in the form of a coil.

In the conventional pipe base screen, there exists the contradiction that a sufficient strength of the screen against the external pressure cannot be obtained if a sufficient number of apertures are formed in the pipe for achieving maximum efficiency in the collection of fluid whereas a desirable efficiency in the collection of fluid cannot be obtained if a sufficient strength is achieved by restricting the number of the apertures at a minimum. It is, accordingly, extremely difficult to provide a pipe base screen which has at once a sufficient strength against the external pressure and a high fluid collecting efficiency in a specific depth and environments in which the screen is used and there frequently occurs a case where the fluid collecting efficiency has to be sacrified for securing a sufficient strength of the screen in specific conditions in which the screen is used. Moreover, in the manufacture of the pipe base screen, a large number of apertures must be formed in the steel base by drilling or machine work. This work requires much labor and time, hampering efficiency in the production of the screen.

It is, therefore, an object of the present invention to provide a novel screen which has eliminated the above described disadvantages of the conventional pipe base screen. According to the invention, the screen comprises a reinforcing member of a substantially cylindrical configuration, a plurality of support rods arranged on the outside of said reinforcing member in the axial direction thereof at a predetermined interval and a wire wound helically on the outside of said support rods at predetermined pitch, a multitude of slits each of which is continuous in substantially the circumferential direction of said reinforcing member being formed at a predetermined pitch in said reinforcing member.

Since the screen made according to the present invention has the reinforcing member which is formed with a multitude of slits each being continuous in the circumferential direction of the reinforcing member, the screen of the same strength as the conventional pipe base screen has a much larger open space than the pipe base screen and, accordingly, the fluid collecting efficiency is greatly improved. The strength of the reinforcing member can be varied easily by suitable determining dimensions and a cross sectional shape of the material forming the slits as well as the pitch of the slits so that the reinforcing member having a required strength can be readily designed. If clogging occurs in the slits of the reinforcing member due to sands or the like, the reinforcing member can be easily cleaned by back rinsing and the life of the well can thereby be prolonged. In the manufacture of the screen, the process of perforating the pipe by drilling or machine work as required in the production of the pipe base screen is obviated so that labour and time in the manufacture of the screen can be greatly saved. Accordingly, a large scale production of the screen can be realized at a reduced cost. Further, the screen of the present invention is advantageous from the standpoint of saving energy and resources in that the waste of metal resources necessitated by perforation of the pipe can be obviated, that the power for pumping can be saved and that transport of the screen can be facilitated, for the screen of the present invention having the same strength as the pipe base screen is much lighter than the pipe base screen.

Preferred embodiment of the invention will now be described in detail in conjunction with the accompanying drawings in which.

The following description is made, by way of example, with respect to a case where the screen of the present invention is used for a water well. It should be noted, however, that the invention is applicable not only to a water well but also to wells for oil and natural gas and other various apparatus and equipments.

Figure 1:
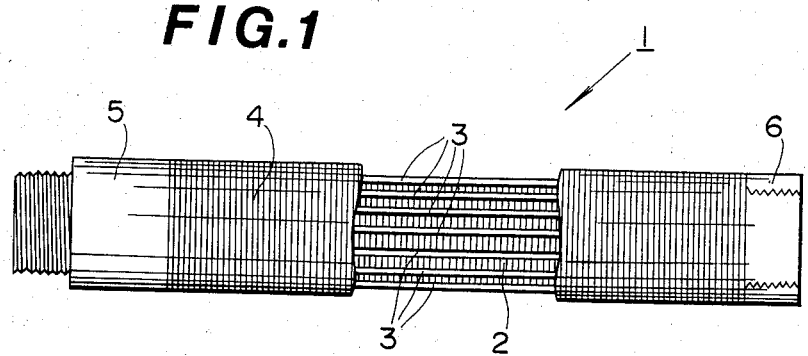
FIG. 1 is a side view of an embodiment of the screen made according to the invention shown with a portion of the outside wire being removed.
Figure 2:
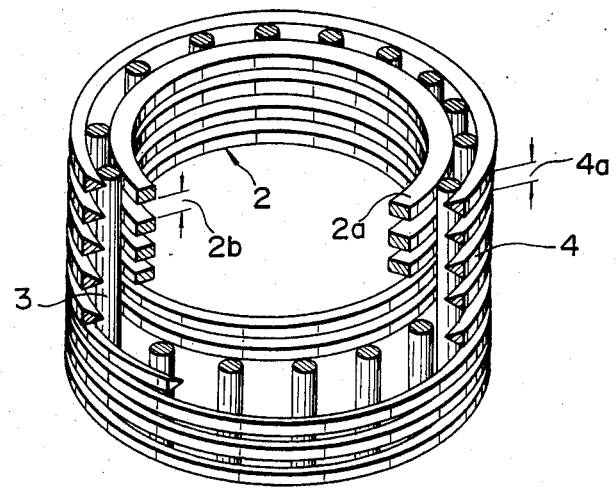
FIG. 2 is an enlarged perspective view of a portion of the screen.

Referring to FIGS. 1 and 2, the screen 1 of the present invention comprises a reinforcing member 2 of a generally cylindrical configuration, a plurality of support rods 3 arranged on the outside of the reinforcing member 2 and a wire 4 which is wound helically on the outside of the support rods 3.

The reinforcing member 2 in the embodiment shown in FIG. 2 consists of a multitude of metal rings 2a which are arranged at an equal interval in the axial direction in such a manner that a slit 2b is formed between each adjacent pair of the slits 2b. The support rods 3 made of metal bars are disposed on the outside surface of the reinforcing member 2 in the axial direction thereof at a predetermined interval. The reinforcing member 2 is rigidly fixed to the support rods 3 by welding points of contact between the support rods 3 and the respective rings 2a. In the embodiment shown in FIG. 2, the rings 2a have a rectangular cross section. Thus, as shown in FIG. 2 the cross sectional width of the rings 2a in the radial direction of the screen is larger than the cross sectional length in the axial direction of the screen. The support rods 3 have a circular cross section. The shapes of the rings 2a and the support rods 3 are not limited to those shown in FIG. 2 but materials of other cross sectional shape such, for example, as a wedge shape and a triangle shape may be employed. The reinforcing member 2 may also be formed by winding a flat bar of a suitable cross section e.g. a rectangular shape, in a helical form. The reinforcing member 2 may also be formed by cutting a helical groove in a metal pipe by machining. In either case, in the reinforcing member 2 thus formed, a multitude of the slits 2b each of which is continuous in substantially the circumferential direction of the reinforcing member 2 are formed at a predetermined pitch.

A metal wire 4 is wound helically on the outside of the support rods 3 so that a continuous slit or opening 4a of a predetermined dimension may be formed. The wire 4 thereafter is welded to the support rod 3 at each point of contact between them. In the embodiment shown in FIG. 2, a wire having a wedge-shaped cross section is used as the wire 4. The shape of the wire 4 is not limited to this but a wire of other cross section shape such as a circular or rectangular shape may be used.

The screen 1 has joint portions 5 and 6 as shown in FIG. 1 and a plurality of such screens 1 are connected together to form a desired deep well.

In the above described embodiment, the points of contact between the reinforcing member 2 and the support rods 3 and the points of contact between the wire 4 and the support rod 3 are respectively welded. The screen 1 may alternatively be composed by having the reinforcing member 2 and the wire 4 pressed respectively against the support rods 3 by utilizing elasticity of the reinforcing member 2 and the wire 4. In this case, the welding process may be omitted.

The screen according to the present invention may also be composed by separately making the reinforcing member 2 of a helically wound flat bar and an assembly of the wire 4 and the support rods 3 in which assembly the wire 4 is wound round the circumferentially disposed support rods 3 and thereafter pushing the reinforcing member 2 into the assembly of the wire 4 and the support rods 3.

Figure 3:
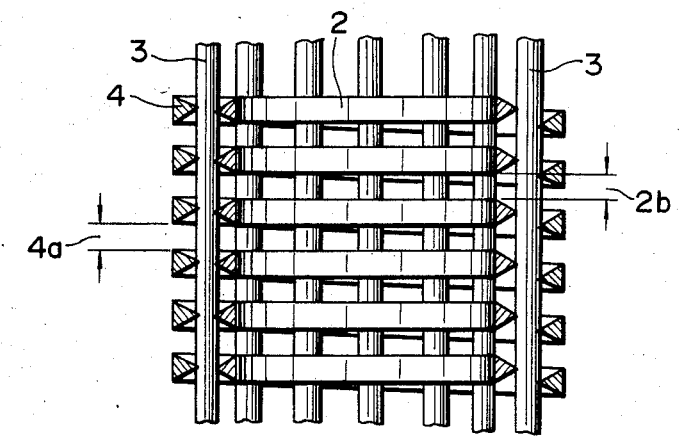
FIG. 3 is a vertical sectional view showing a portion of another embodiment of the invention in which the reinforcing member has a screen function.

FIG. 3 shows another embodiment of the invention in which the reinforcing member 2 is made of a wire having a cross section suited for performing a screening function (i.e. a screening element) such as a wedge-shape or a triangular shape. The reinforcing member 2 in this embodiment performs not only the reinforcing function but also the screening function. The screen 1 of this embodiment therefore, serves as a screen having two screening surfaces.

If the cylindrical screen 1 made according to the invention is cut in one side thereof in the axial direction and thereafter is unfolded to a flat shape, an arcuate shape or other desired shapes, the screen may be utilized not only for a well screen or strainer but also for filtering, supporting catalyst, partitioning, reinforcing a filter and many other purposes. In this case, the wire 4, the support rods 3 and the reinforcing member 2 (serving also as a screen) should preferably be welded together. The inside slit and the outside slit may be of the same dimension or different ones.

The screen 1 need not necessarily be made of metal but it may be made of synthetic resin, glass fibre or other material according to conditions and an environment in which the screen is used.

What is claimed is:

1. A screen for use in environments in which a large external pressure is applied to the screen such as a deep well comprising:
    a plurality of support rods arranged substantially cylindrically at a predetermined interval in the circumferential direction of the screen:
    a wire wound helically on the outside of said support rods at a predetermined pitch to perform a screening function; and
    a reinforcing member of substantially cylindrical configuration made of a plurality of rings arranged on the inside of said support rods at an equal interval in the axial direction, said rings having a cross section such that their length in the radial direction is larger than their length in the axial direction;
    said wire and said reinforcing member being rigidly fixed to said support rods respectively by welding.

2. A screen as defined in claim 1 wherein said reinforcing member has a shape adapted for use as a screening element of the screen.

3. A screen as defined in claim 2 wherein said reinforcing member has a triangular cross section.

4. A screen for use in environments in which a large external pressure is applied to the screen such as a deep well comprising:
    a plurality of support rods arranged substantially cylindrically at a predetermined interval in the circumferential direction of the screen;
    a wire wound helically on the outside of said support rods at a predetermined pitch to perform a screening function; and
    a reinforcing member of a substantially cylindrical configuration made of a helical wire with a predetermined pitch arranged on the inside of said support rods, said wire having a cross section such that its length in the radial direction is larger than its cross sectional length in the axial direction of the screen;
    said wire and said reinforcing member being ridgidly fixed to said support rods respectively by welding.

5. A screen as defined in claim 4 wherein said reinforcing member has a shape adapted for use as a screening element of the screen.

6. A screen as defined in claim 3 wherein said reinforcing member has a triangular cross section.

* * * * *